United States Patent
Dewan et al.

(10) Patent No.: US 7,917,724 B2
(45) Date of Patent: Mar. 29, 2011

(54) PROTECTION OF USER-LEVEL APPLICATIONS BASED ON PAGE TABLE INFORMATION

(75) Inventors: Prashant Dewan, Hillsboro, OR (US); Uday Savagaonkar, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 612 days.

(21) Appl. No.: 12/005,681

(22) Filed: Dec. 28, 2007

(65) Prior Publication Data

US 2009/0172330 A1   Jul. 2, 2009

(51) Int. Cl.
*G06F 12/14* (2006.01)
*G06F 12/02* (2006.01)

(52) U.S. Cl. ............... 711/206; 711/163; 711/E12.014

(58) Field of Classification Search ............ None
See application file for complete search history.

(56) References Cited

U.S. PATENT DOCUMENTS

| 6,986,006 B2 * | 1/2006 | Willman et al. ............ 711/152 |
| 2007/0005992 A1 | 1/2007 | Schlussler et al. ............ 713/193 |
| 2007/0006175 A1 | 1/2007 | Durham et al. ............ 717/131 |
| 2007/0156999 A1 | 7/2007 | Durham et al. ............ 711/170 |

* cited by examiner

*Primary Examiner* — Reginald G Bragdon
*Assistant Examiner* — Eric Loonan
(74) *Attorney, Agent, or Firm* — Trop, Pruner & Hu, P.C.

(57) ABSTRACT

In one embodiment, the present invention includes a virtual machine monitor (VMM) to access a protection indicator of a page table entry (PTE) of a page of a set of memory buffers and determine a state of the protection indicator, and if the protection indicator indicates that the page is a user-level page and if certain information of an agent that seeks to use the page matches that in a protected memory address array, a page table base register (PTBR) is updated to a protected page table (PPT) base address. Other embodiments are described and claimed.

15 Claims, 4 Drawing Sheets

PROTECTION OF USER-LEVEL APPLICATIONS BASED ON PAGE TABLE INFORMATION

BACKGROUND

Virtual machine monitor (VMM)-based mechanisms can protect in-memory components from snooping or modification by malicious code by a paradigm of identify, measure and protect. An Integrity Measurement Module (IMM) runs in protected space outside the bounds of the operating system (OS) (and associated malware) in protected hardware or in a protected virtual machine (VM) running on top of the VMM. The IMM verifies the identity and integrity of the executing program against a signature file containing a cryptographic hash of code sections, the entry points into the code sections and the relocation table. Once identified and measured, the IMM signals a Memory Protection Module (MPM) to enforce the protections.

While this mechanism works because the kernel (i.e., ring-0) linear address space across all user level (i.e., ring-3) processes is mapped to the same set of physical pages, this does not hold true for the ring-3 memory.

DETAILED DESCRIPTION

Embodiments provide a mechanism to protect ring-3 applications using protection information (referred to herein as a protection bit) present in page tables. In order to do so, when a VMM identifies a memory page as a ring-3 page, it stores a page table base register (PTBR) value for each memory area protected. In various embodiments, a MPM or other protection mechanism, which may be implemented in a VMM, creates a page table called a Protected Page Table (PPT) and maps protected code and data pages to the PPTs and severs the mapping from Active Page Tables (APTs). The VMM keeps a list of virtual address ranges of protected memory and the physical addresses of protected pages. On every page fault, the VMM compares the virtual address of the destination page with the list of protected page addresses and if a match is found it switches the PTBR in a virtual machine control structure (VMCS) to the address of the PPT base address. On return, it switches it back from the PPT address to the APT base address. The list of physical page addresses corresponding to the protected linear addresses is checked every time the VMM tries to add a page to the APTs. If the VMM finds a protected page it does not add it to the APT and raises and error.

In one embodiment, to initiate protection mechanisms, an agent registers its memory area(s) with a VMM by sending descriptors containing the start and end addresses of a memory buffer to the VMM via a hyper call. For each descriptor the VMM parses the active page tables with the start location of the memory (in the descriptor) and ascertains if the page is a user (ring-3) or a supervisor (ring 0) page. For each user page, the VMM caches the Page Table Base Address (PTBA) of the page and the physical Page Base Address (PBA). For all ring 0 pages, the VMM only stores the PBA of the pages.

Subsequently, the protected pages are isolated in a separate page table. Then every time a protected section is accessed from an unprotected section or vice versa, there is a page fault and the VMM page fault handler compares the PBA with the values stored in the VMM cache. If the addresses match, the PTBA is compared with the PTBA in the cache. If the PTBA values match or the cached value is NULL (indicating a ring 0 page) the Page Table Base Register (PTBR) is switched to the Protected PTBR and control returns to the protected code. Thus in order to protect ring-3 pages, the VM not only identifies a page as ring-3 but also stores the PTBR value for each ring-3 memory area protected.

Figure 1:
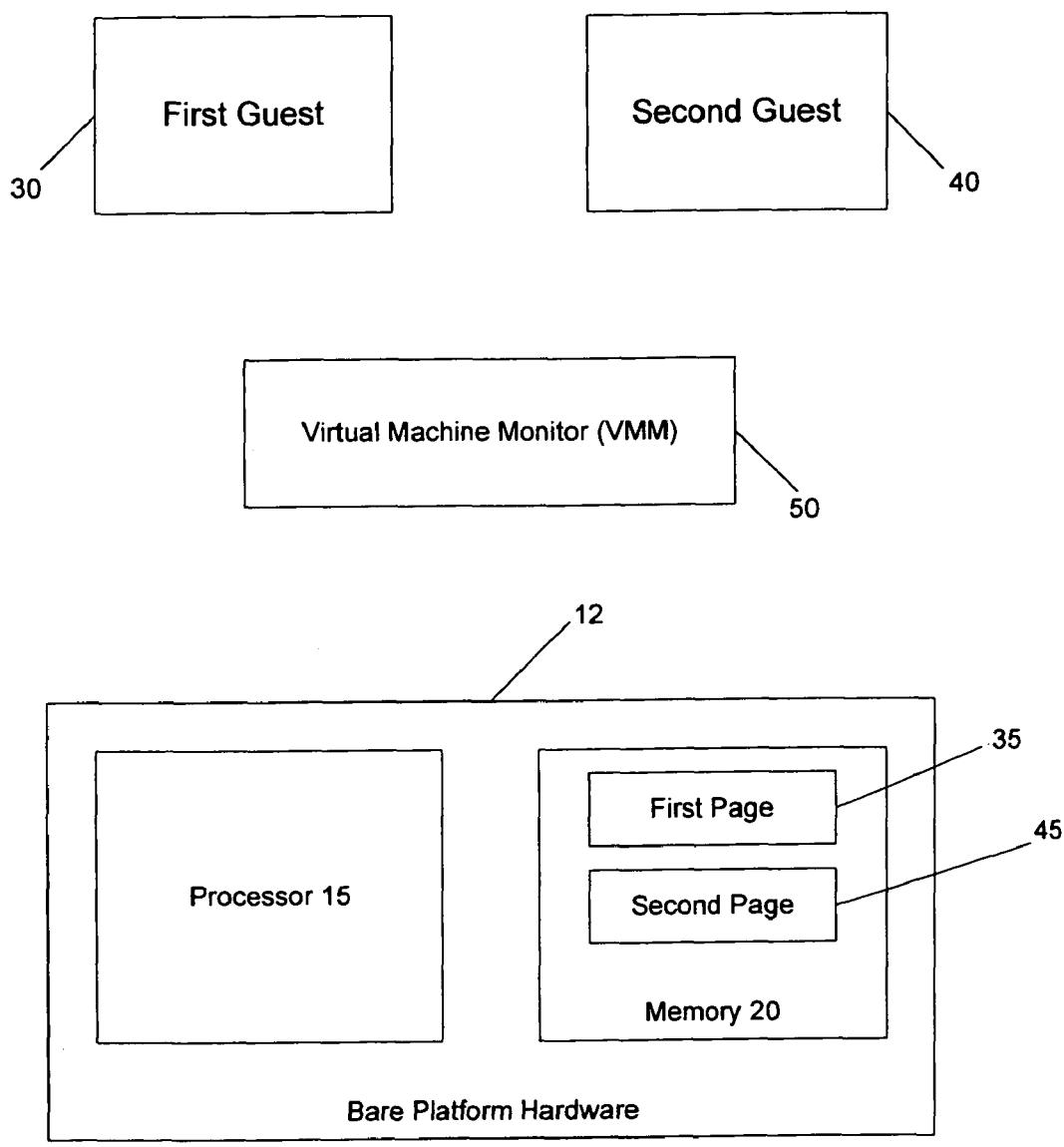
FIG. 1 is a block diagram of a portion of a system in accordance with one embodiment of the present invention.

Referring now to FIG. 1, shown is a block diagram of a portion of a system in accordance with one embodiment of the present invention. As shown in FIG. 1, system 10 includes bare platform hardware 12 including a processor 15 and system memory 20, and various software entities, including a first guest software (i.e., a first guest) 30, a second guest software (i.e., a second guest) 40 and a virtual machine monitor (VMM) 50. A layer of abstraction, i.e., a virtual machine (VM) may exist between the guest and VMM 50. Guest 30 (for example) may include an OS and other software components. Upon a designated event, VMM 50 may identify and partition off portions of the source code to control access to the partitioned portions. In one embodiment, system memory 20 may include both code and data and may be formed of dynamic random access memory (DRAM), for example.

In the embodiment of FIG. 1, VMM 50 may present to other software (e.g., the guest software) the abstraction of one or more virtual machines. VMM 50 may provide the same or different abstractions to the various guests. The guest software running on each VM may include a guest OS and various guest software applications. Collectively, guest OS and software applications are referred to herein as guest software. Guest software expects to access physical resources (e.g., processor registers, memory and input/output (I/O) devices) within the VMs on which the guest software is running. VMM 50 may facilitate access to resources such as processor 15 desired by guest software while retaining ultimate control over resources within platform hardware.

In one embodiment, information stored in one or more designated fields in a virtual machine control structure (VMCS) (not shown specifically in FIG. 1) may be used in determining whether a page to be accessed is protected. For example, the VMCS may store the state of the guest software and information to control operation thereof, such as control register values (e.g., CR3 values or other such control register values). The VMCS may reside in memory 20 and may be maintained by processor 15. It is to be understood that any other data structure (e.g., an on-chip cache, a file, a lookup table, etc.) may be used to store the information stored in the VMCS.

As shown in FIG. 1, memory 20 may include a first page 35 that may be accessed using a page table entry (PTE) for first guest software 30 and a second page 45 that may be accessed using a PTE for second guest software 40. That is, first page 35 and second page 45 may contain code and/or data corresponding to first guest 30 and second guest 40, respectively.

The OS may create a guest page table (GPT) in an OS domain, mapping linear addresses of components executing in guest 30 to physical addresses or page frames. VMM 50 may monitor and trap register pointer (e.g., CR3) changes. When the OS creates a GPT and provides a CR3 value pointing to it, VMM 50 may trap on the CR3 change, create an active page table (APT) (which may be a duplicate copy of the GPT) in VMM 50, and change the CR3 value to a value pointing to the APT. In this way, VMM 50 can coordinate accesses to memory 20 from a number of guests. In this embodiment, VMM 50 may also create a protected page table (PPT). VMM 50 may copy the page frames having the active content into the PPT and assign the PTEs that do not refer to those page frames with access characteristics to cause a page fault upon execution.

Figure 2:
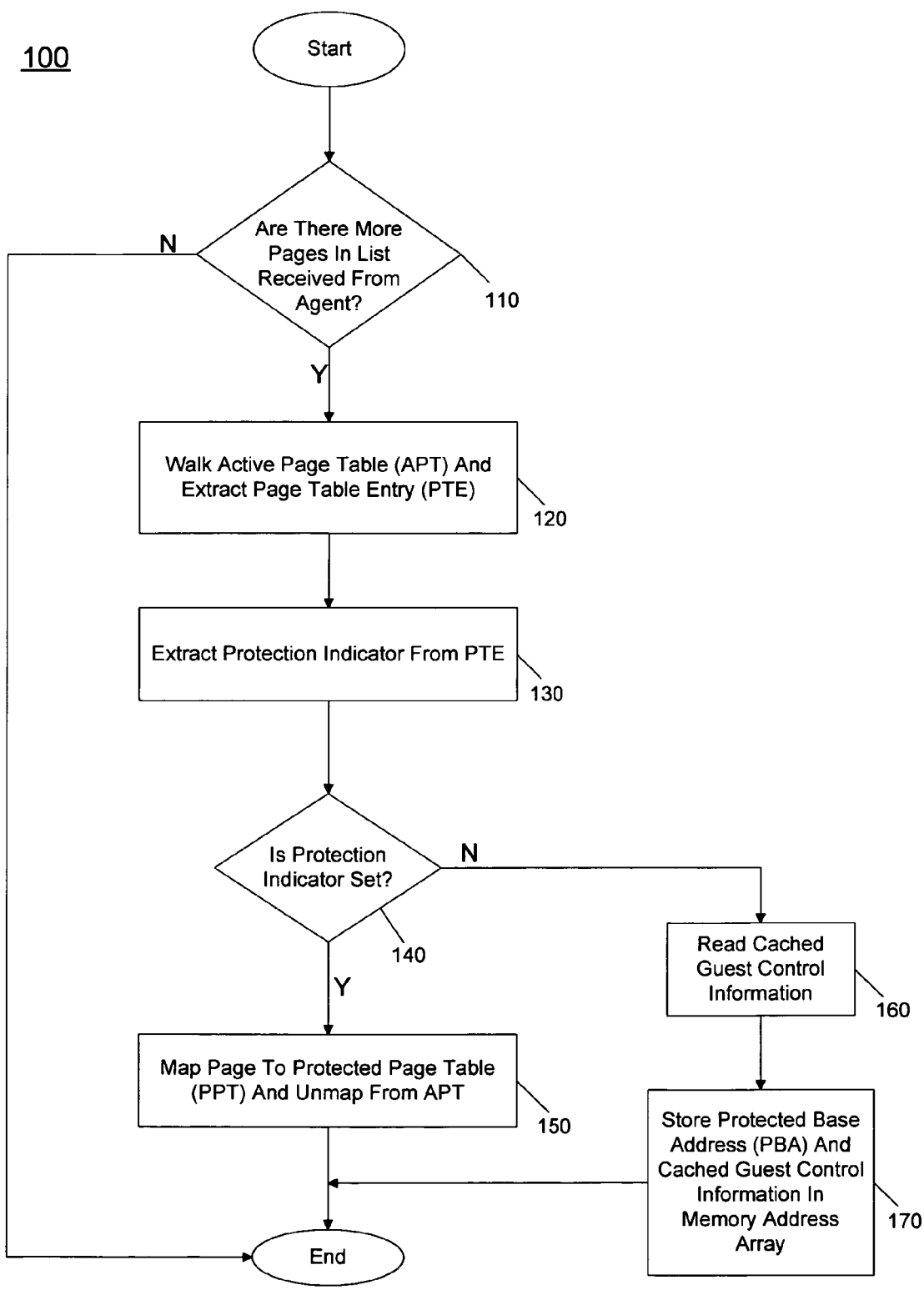
FIG. 2 is a flow diagram of a registration method in accordance with one embodiment of the present invention.

Referring now to FIG. 2, shown is a flow diagram of a registration method in accordance with one embodiment of the present invention. As shown in FIG. 2, method 100 may begin by determining whether more pages are received in a list received from an agent (diamond 110). More specifically, the list may be part of a request from an agent to register a set of memory buffers. The agent, as will be discussed further below, may be a kernel level or user level (i.e., a ring-0 or ring-3) agent and the list may be part of the registration process via a ring-agnostic hyper call.

Still referring to FIG. 2, for each page in the memory buffer, the VMM may walk the active page table and extract the corresponding page table entry for the page (block 120). Still further, the VMM may extract a protection indicator such as a U/S bit from the PTE for the page (block 130). In one embodiment this protection indicator may be a bit number 3 of the PTE, although the scope of the present invention is not limited in this regard. Then it may be determined whether the protection indicator is set (diamond 140). If the indicator is not set, i.e., the U/S bit is a zero value, this signifies that the corresponding page in the memory buffer is a user page. Accordingly, control passes to block 160 where cached control information of the guest may be read. More specifically, a cached guest control register (CR3) register value may be obtained, e.g., from a VMCS that is read at the time of the hyper call. Then, a protected base address (PBA) and the guest control information (i.e., the cached guest CR3 register) may be stored in a protected memory address array (block 170).

Referring still to FIG. 2, if the protection indicator is determined to be set at diamond 140, this indicates presence of a kernel page. Accordingly, control passes to block 150 where the VMM stores the PBA and a null value in the protected memory address array. Still further, the VMM maps the page to the protected page table and accordingly unmaps it from the active page table (block 150). Note that the protected page(s) may be allowed to be read from the APTs, but may be write protected, such that technically, they are not unmapped, but instead access controlled. Method 100 then concludes and control returns to the agent for further processing. In this way, a set of memory buffers can be registered responsive to a ring-agnostic hyper call.

Figure 3:
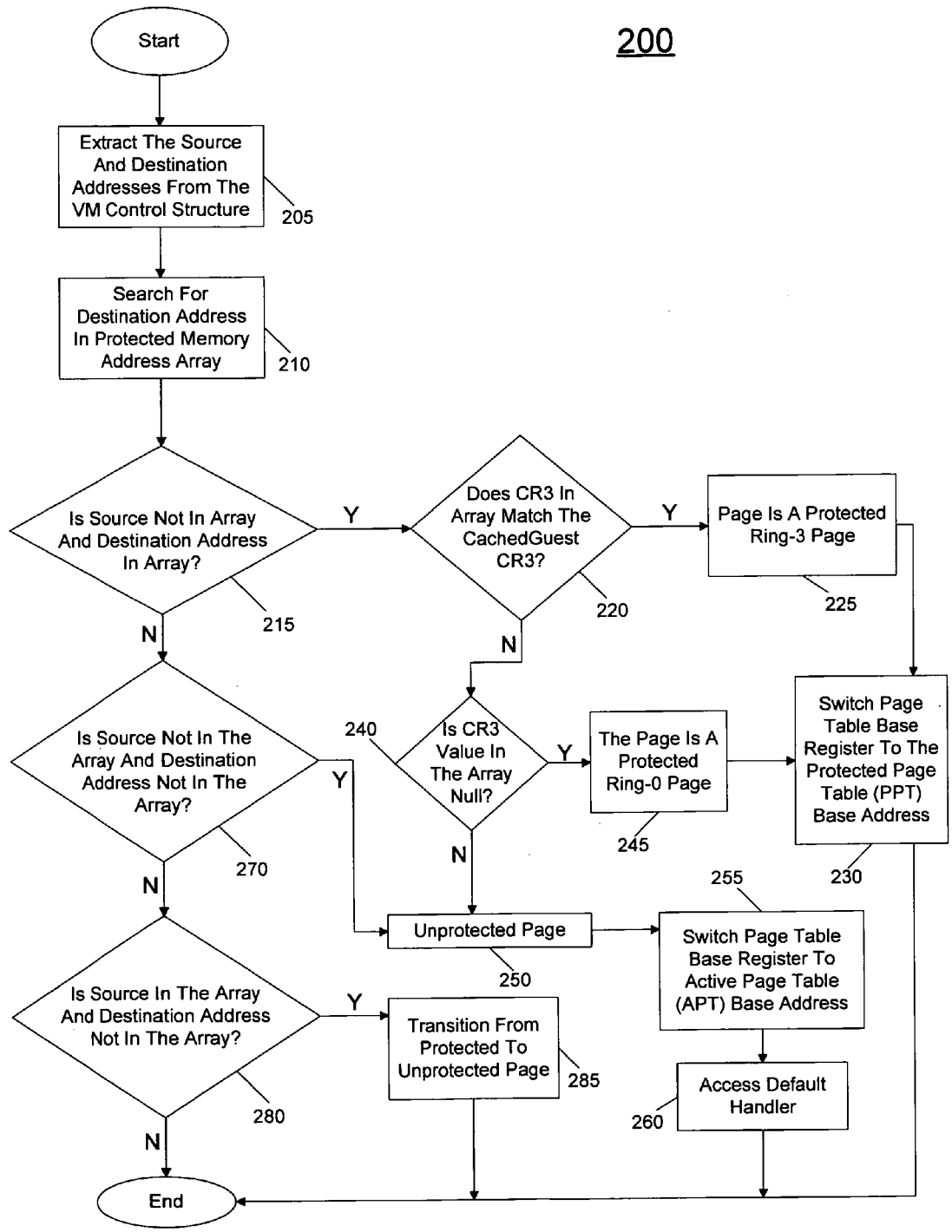
FIG. 3 is a flow diagram of a method for handling a fault in accordance with an embodiment of the present invention.

Then during operation, when an unprotected page tries to execute code on a protected page (e.g., by a jump/call operation) or tries to read a protected data page, a page fault is generated. Referring now to FIG. 3, shown is a flow diagram of a method for handling a page fault in accordance with an embodiment of the present invention. As shown in FIG. 3, method 200 may begin by extracting a source and destination address from a VM control structure (block 205). Using this information, the destination address may be searched for in protected memory space, i.e., the protected memory address array (block 210). Based on this searching, it may be determined whether the source of the fault is not in the protected memory address array and destination address is in the protected memory address array (diamond 215). If so, the faulting access seeks to access a protected page and control passes to diamond 220. There it may be determined whether the CR3 value in the array matches the cached guest CR3 value in the VMCS (diamond 220). If so, the page is a protected ring-3 page. Accordingly, control passes to block 230 where the page table base register may be switched to a protected page table base address.

Referring still to FIG. 3, if instead at diamond 220 it is determined that the CR3 value in the array does not match the cached guest CR3 value in the VMCS, control passes to diamond 240, where it may be determined whether this CR3 value in the array is a null value. If so, control passes to block 245, which indicates that the page is a protected ring-0 page. Accordingly, control passes to block 230, discussed above. If instead the determination in diamond 240 is that the CR3 value in the array is not a null value, the page is instead an unprotected page (block 250) and control passes to block 255 where the page table base register may be switched to the active page table base address. Control then passes to block 260 where a default handler such as a virtual translation lookaside buffer (TLB) handler may be initiated to allow for accessing of the unprotected page.

Referring still to FIG. 3, if instead at diamond 215 a negative determination is made, control passes to diamond 270 where it may be determined if the source and destination addresses are not in the array. If so, this indicates that the page is an unprotected page (block 250) and accordingly, control passes to block 255, discussed above. If instead it is determined that at least one of the source and destination addresses are in the array, control passes to diamond 280 where it may be determined whether the source is in the array and the destination address not. If so, the corresponding memory page may be transitioned from a protected page to an unprotected page (block 285). Otherwise, method 200 may end. While shown with this particular implementation in the embodiment of FIG. 3, the scope of the present invention is not limited in this regard.

Embodiments thus enable seamless extending of virtual integrity service (VIS) protections to ring-3 applications by leveraging information in legacy paging structures. Still further, embodiments provide sandboxing capabilities to ring-3 applications in which all accesses in and out of the protected region can be tightly monitored by the VMM. In this way applications such as Software Sandboxing and Software as a Service (SaaS) can be used. Embodiments thus extend a trust boundary starting from a trusted platform module (TPM) all the way into ring-3 applications, where a majority of the software is implemented.

This information contained in legacy paging structures can thus be used to determine the scope of VIS protections seamlessly (without involving the OS to communicate this information to the VMM). Application sandboxing can also be performed without having to resort to OS-dependent application programmer interfaces (API) interception methods that cannot provide protection from ring-0 malware.

Figure 4:
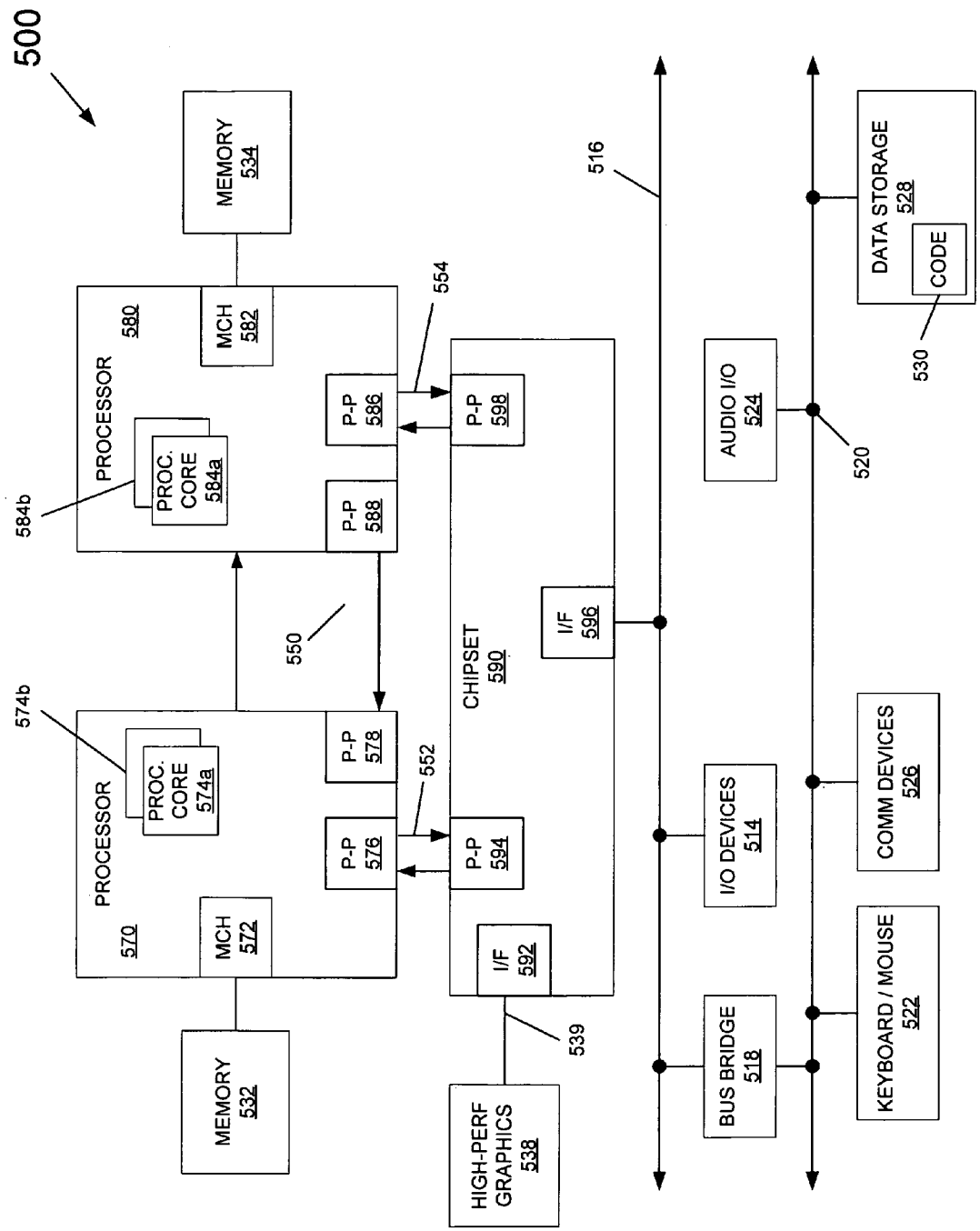
FIG. 4 is a block diagram of a system in accordance with one embodiment of the present invention.

Embodiments may be implemented in many different system types. Referring now to FIG. 4, shown is a block diagram of a system in accordance with an embodiment of the present invention. As shown in FIG. 4, multiprocessor system 500 is a point-to-point interconnect system, and includes a first processor 570 and a second processor 580 coupled via a point-to-point interconnect 550. As shown in FIG. 4, each of processors 570 and 580 may be multicore processors, including first and second processor cores (i.e., processor cores 574a and 574b and processor cores 584a and 584b). Each processor core may include hardware, software, firmware or combinations thereof to enable protection of ring-3 memory pages in accordance with an embodiment of the present invention.

Still referring to FIG. 4, first processor 570 further includes a memory controller hub (MCH) 572 and point-to-point (P-P) interfaces 576 and 578. Similarly, second processor 580 includes a MCH 582 and P-P interfaces 586 and 588. As shown in FIG. 4, MCH's 572 and 582 couple the processors to respective memories, namely a memory 532 and a memory 534, which may be portions of main memory (e.g., a dynamic random access memory (DRAM)) locally attached to the respective processors. First processor 570 and second processor 580 may be coupled to a chipset 590 via P-P interconnects 552 and 554, respectively. As shown in FIG. 4, chipset 590 includes P-P interfaces 594 and 598.

Furthermore, chipset 590 includes an interface 592 to couple chipset 590 with a high performance graphics engine 538 via a P-P interconnect 539. In turn, chipset 590 may be coupled to a first bus 516 via an interface 596. As shown in FIG. 4, various I/O devices 514 may be coupled to first bus 516, along with a bus bridge 518 which couples first bus 516 to a second bus 520. Various devices may be coupled to second bus 520 including, for example, a keyboard/mouse 522, communication devices 526 and a data storage unit 528 such as a disk drive or other mass storage device which may include code 530, in one embodiment. Further, an audio I/O 524 may be coupled to second bus 520.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
registering a set of memory buffers responsive to a ring agnostic hyper call from a first agent, wherein at least one page of the set of memory buffers is to be mapped to a protected page table (PPT) and access-controlled from an active page table (APT), if a protection indicator of a page table entry (PTE) associated with the at least one page is of a first value to indicate a kernel page; and
switching a page table base register (PTBR) of a virtual machine control structure (VMCS) to a PPT base address if a destination address of a faulting access is in a memory address array and a control register value of the memory address array matches a guest control register value of the VMCS, to indicate that a second page corresponding to the faulting access is a protected user-level page.

2. The method of claim 1, further comprising switching the PTBR to an APT base address if a source address and the destination address of the faulting access are not in the memory address array.

3. The method of claim 2, further comprising switching the PTBR to the APT base address if the source address is in the memory address array and the destination address is not in the memory address array.

4. The method of claim 3, further comprising switching the PTBR to the ABT base address to transition the page associated with the faulting access from a protected page to an unprotected page.

5. The method of claim 1, further comprising switching the PTBR to the PPT base address if the destination address is in the memory address array, the control register value of the memory address array does not match the guest control register value of the VMCS and the control register value of the memory address array is a null value, to indicate the page corresponding to the faulting access is a protected kernel-level page.

6. The method of claim 1, further comprising, if the protection indicator of the PTE is of a second value to indicate a user-level page, storing the guest control register value of the VMCS and a protected base address (PBA) in the memory address array.

7. An article comprising a machine-accessible storage medium including instructions that when executed cause a system to:
register a set of memory buffers, wherein at least one page of the set of memory buffers is to be mapped to a protected page table (PPT) if a protection indicator of a page table entry (PTE) associated with the at least one page is of a first value to indicate a kernel page and if the protection indicator is of a second value to store a guest control register value and a protected base address (PBA) in a memory address array; and
switch a page table base register (PTBR) of a virtual machine control structure (VMCS) to a PPT base address if a destination address of a faulting access is in the memory address array and a control register value of the memory address array matches a guest control register value of the VMCS, to indicate that a second page corresponding to the faulting access is a protected user-level page.

8. The article of claim 7, further comprising instructions that when executed enable the system to switch the PTBR to an active page table (APT) base address if a source address and the destination address of the faulting access are not in the memory address array.

9. The article of claim 8, further comprising instructions that when executed enable the system to switch the PTBR to the APT base address if the source is in the memory address array and the destination address is not in the memory address array.

10. The article of claim 9, further comprising instructions that when executed enable the system to switch the PTBR to the ABT base address to transition the page associated with the faulting access from a protected page to an unprotected page.

11. The article of claim 7, further comprising instructions that when executed enable the system to switch the PTBR to the PPT base address if the destination address is in the memory address array, the control register value of the memory address array does not match the guest control register value of the VMCS and the control register value of the memory address array is a null value, to indicate the page corresponding to the faulting access is a protected kernel-level page.

12. A system comprising:
a processor to execute instructions;

a protected memory address array coupled to the processor; and a virtual machine monitor (VMM) to execute on the processor to access a protection indicator of a page table entry (PTE) of a page of a set of memory buffers and determine a state of the protection indicator, and if of a first state to store a Page Base Address (PBA) and a cached guest control register obtained from a virtual machine control structure (VMCS) in the protected memory address array, and if of a second state to store the PBA and a predetermined value in the protected memory address array, map the page to a protected page table (PPT) and unmap the page from an active page table (APT), and switch a page table base register (PTBR) of the VMCS to a PPT base address if a destination address of a faulting access to a page is in the protected memory address array and the cached guest control register of the protected memory address array matches a guest control register value, to indicate that the page corresponding to the faulting access is a protected user-level page.

13. The system of claim 12, wherein the VMM is to switch the PTBR to an APT base address if a source address and the destination address of the faulting access are not in the protected memory address array.

14. The system of claim 13, wherein the VMM is to switch the PTBR to the APT base address if the source address is in the protected memory address array and the destination address is not in the protected memory address array and to transition the page from a protected page to an unprotected page.

15. The system of claim 12, wherein the VMM is to switch the PTBR to the PPT base address if the destination address is in the protected memory address array, the cached guest control register of the protected memory address array does not match the guest control register value and the predetermined value is present in the protected memory address array to indicate the page corresponding to the faulting access is a protected kernel-level page.

* * * * *

UNITED STATES PATENT AND TRADEMARK OFFICE
CERTIFICATE OF CORRECTION

| | |
|---|---|
| PATENT NO. | : 7,917,724 B2 |
| APPLICATION NO. | : 12/005681 |
| DATED | : March 29, 2011 |
| INVENTOR(S) | : Prashant Dewan et al. |

It is certified that error appears in the above-identified patent and that said Letters Patent is hereby corrected as shown below:

Column 5:
Line 49, "to a ring agnostic hyper call" should be --to a call--.

Signed and Sealed this
Fourteenth Day of June, 2011

David J. Kappos
*Director of the United States Patent and Trademark Office*